(12) United States Patent
Johnson et al.

(10) Patent No.: US 7,300,064 B2
(45) Date of Patent: Nov. 27, 2007

(54) LATERAL CONTROL MECHANISM FOR AN AXLE BEAM SUSPENSION SYSTEM

(75) Inventors: James J Johnson, Metamora, MI (US); Alexandre Opeiko, Windsor (CA); Ronald Williams, Oxford, MI (US); Mohamed Abbadi, Auburn Hills, MI (US)

(73) Assignee: Chrysler LLC, Auburn Hills, MI (US)

( * ) Notice: Subject to any disclaimer, the term of this patent is extended or adjusted under 35 U.S.C. 154(b) by 334 days.

(21) Appl. No.: 11/083,622

(22) Filed: Mar. 17, 2005

(65) Prior Publication Data

US 2006/0208444 A1    Sep. 21, 2006

(51) Int. Cl.
*B60G 21/05* (2006.01)
(52) U.S. Cl. .......................... 280/124.106; 280/124.11
(58) Field of Classification Search ........... 280/124.11, 280/124.13, 124.111, 124.116, 124.106, 124.107, 280/124.169, 124.166, FOR. 182, FOR. 183
See application file for complete search history.

(56) References Cited

U.S. PATENT DOCUMENTS 5,445,404 A    8/1995    Shida et al.

OTHER PUBLICATIONS

SAE Technical Paper Series 950585; "Development of a Multi-Link Beam Rear Suspension for Front-Wheel-Drive Cars;" Yoichiro Kato, Yoshiro Tateishi and Naoto Ogawa of Nissan Motor Co., Ltd.; cover + pp. 227-236; 1995.

*Primary Examiner*—Paul N. Dickson
*Assistant Examiner*—Drew J. Brown
(74) *Attorney, Agent, or Firm*—Ralph E. Smith

(57) ABSTRACT

An axle beam suspension system for a mobile vehicle, the system includes a main vehicle body, an axle attached to the main vehicle body, a control bar, and a track bar. The track bar includes a controlling connection portion. A first end of the track bar is attached at a lateral attachment to a lateral joint connection portion of the main vehicle body. A second end of the track bar is attached at a pivot attachment to a pivot joint portion on the axle. The control bar has a first end attached at a control attachment to a control joint connection portion of the main vehicle body and a second end attached at a fourth attachment to the controlling connection portion of the track bar. A lateral portion of an axle-pivoting-movement is transferred into lateral movement of the axle beam suspension system.

9 Claims, 4 Drawing Sheets

LATERAL CONTROL MECHANISM FOR AN AXLE BEAM SUSPENSION SYSTEM

FIELD OF THE INVENTION

This invention relates generally to axle beam suspension systems. In particular, the invention relates to transferring the lateral movement of a wheel on a pivoting axle to the axle beam suspension system.

BACKGROUND OF THE INVENTION

Conventional mobile vehicles are typically equipped with suspension systems to manage the impact of forces and disturbances on the roadway so the vehicle occupants experience a comfortable ride. Axle beam suspension systems operate to reduce the vehicle roll and the shake of the occupants of the mobile vehicle.

Axle beam suspension systems in which a track bar extends across the width of the region between wheels opposably positioned at the ends of the axle generally provide a suspension geometry without lateral shift. However, a suitable length track bar cannot be accommodated in some vehicles, which have packaging constraints and/or lack attaching structures. Short track bars are used in such cases, however the shortened length results in a lateral shift in the suspension geometry. This causes the vehicle to shake and vibrate when the wheel on the axle jounces and rebounds.

In addition, the lateral shift caused by the shortened track bar affects the wheel, tire, and coil spring packaging envelopes. Additional clearance inboard and outboard of the wheel and coil spring packages is required to accommodate the kinematics shift in the suspension geometry. The shortened track bar also necessitates an additional space for the axle beam packaging and for any component attached to or near the axle beam.

A conventional track bar, either shortened or typical length, has only one body structure attachment. The vehicle loads are transmitted through this single attachment. This concentrated load degrades the noise levels and harshness measurements of the ride. This concentrated load also necessitates additional body structure to support the load.

It is desirable to reduce the packaging space required in a vehicle and to eliminate or reduce the lateral shift in the suspension geometry while using a shortened track bar. It is further desirable to improve the noise levels and harshness measurements of the ride due to a track bar in a suspension system having a single attachment to the vehicle body.

SUMMARY OF THE INVENTION

A first aspect of the present invention provides an axle beam suspension system for a mobile vehicle. The system includes a main vehicle body, an axle attached to the main vehicle body, a control bar, and a track bar including a controlling connection portion. A first end of the track bar is attached at a lateral attachment to a lateral joint connection portion of the main vehicle body. A second end of the track bar is attached at a pivot attachment to a pivot joint portion on the axle. The control bar has a first end attached at a control attachment to a control joint connection portion of the main vehicle body and a second end attached at a fourth attachment to the controlling connection portion of the track bar. A lateral portion of an axle-pivoting-movement is transferred into lateral movement of the axle beam suspension system.

A second aspect of the present invention provides an axle beam suspension system for a mobile vehicle. The system includes a main vehicle body having a first downward projecting attachment bracket and a second downward projecting attachment bracket. The system also includes an axle attached to the main vehicle body and a track bar including a flange portion extending from the track bar in a mid-region. The track bar is attached at a first end to the first downward projecting attachment bracket and is attached at a second end to a pivot joint attachment bracket on the axle, wherein a first end connection allows for a lateral movement of the first end about the first downward projecting attachment bracket. System also includes a control bar attached at a first end to the second downward projecting attachment bracket and attached at a second end to the flange portion of the track bar. A lateral portion of an axle-pivoting-movement is transferred into lateral movement of the axle beam suspension system.

A third aspect of the present invention provides an axle beam suspension system for a mobile vehicle body including a vehicle body and an axle movably attached to the vehicle body. The system also includes means to transfer a lateral portion of an axle-pivoting-movement of the axle into a lateral movement of the axle beam suspension system, whereby a wheel attached to an end of the axle moves vertically.

BRIEF DESCRIPTION OF THE DRAWINGS

Other aspects, features, and advantages of the present invention will become more fully apparent from the following detailed description of the preferred embodiment, the appended claims, and in the accompanying drawings in which like references indicate similar elements, and in which:

DETAILED DESCRIPTION OF THE PREFERRED EMBODIMENTS

Figure 1:
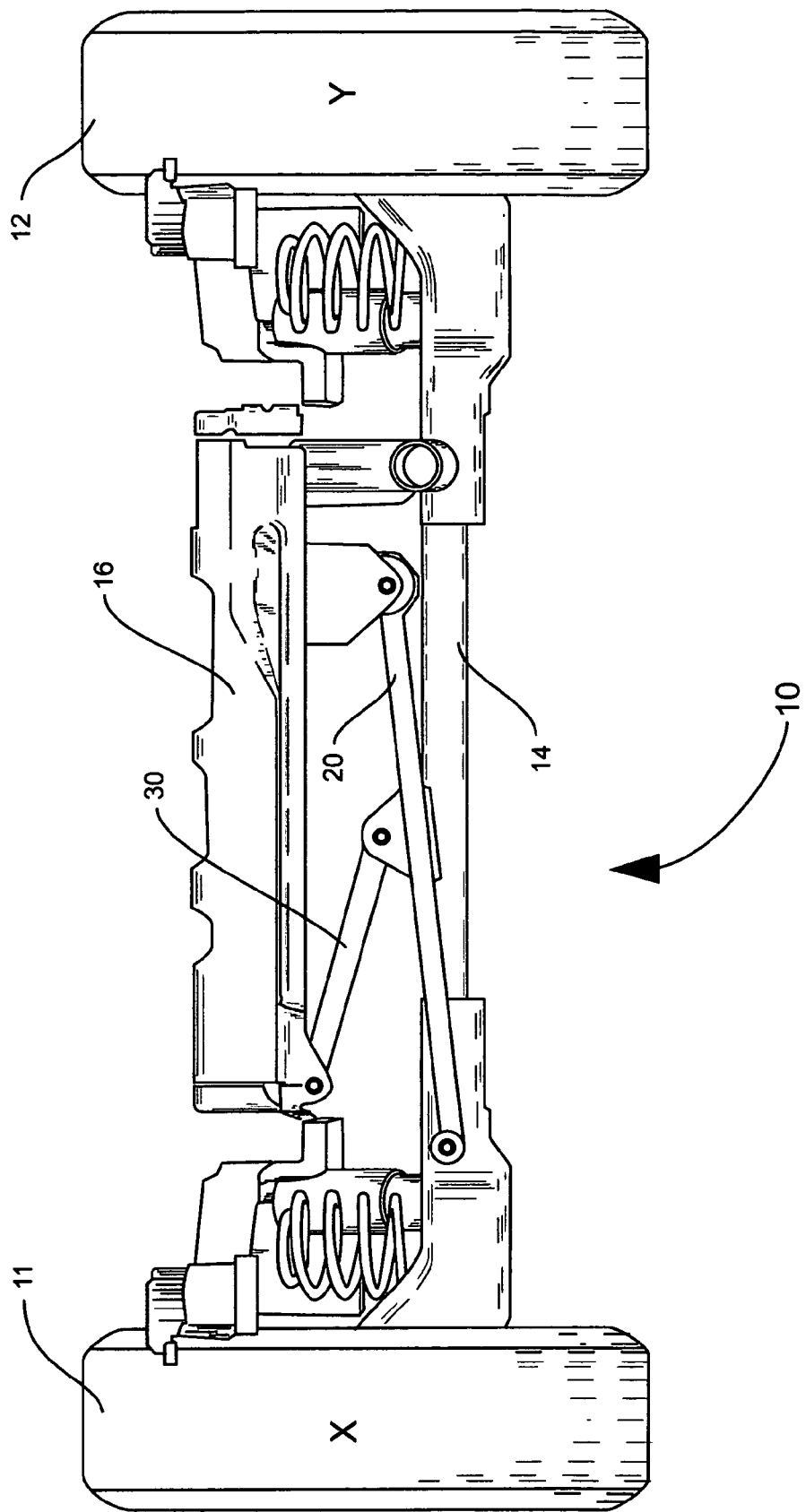
FIG. 1 illustrates a rear view of an axle beam suspension system in a mobile vehicle in accordance with the present invention.

FIG. 1 illustrates a rear view of an axle beam suspension system 10 in a mobile vehicle (not shown) in accordance with the present invention. The axle beam suspension system 10 includes a main vehicle body 16, of which only a bottom portion is illustrated, an axle 14 movably attached to the main vehicle body 16, a track bar 20, and a control bar 30. The axle 14 connects a first wheel 11 and a second wheel 12 at opposing ends. The first wheel 11 and the second wheel 12 include the appropriate tires, brakes and any other components required for the mobile vehicle as known in the art. Point X and point Y approximately indicate the rearward projections of the points where axle 14 is attached to first wheel 11 and second wheel 12, respectively.

Figure 2:
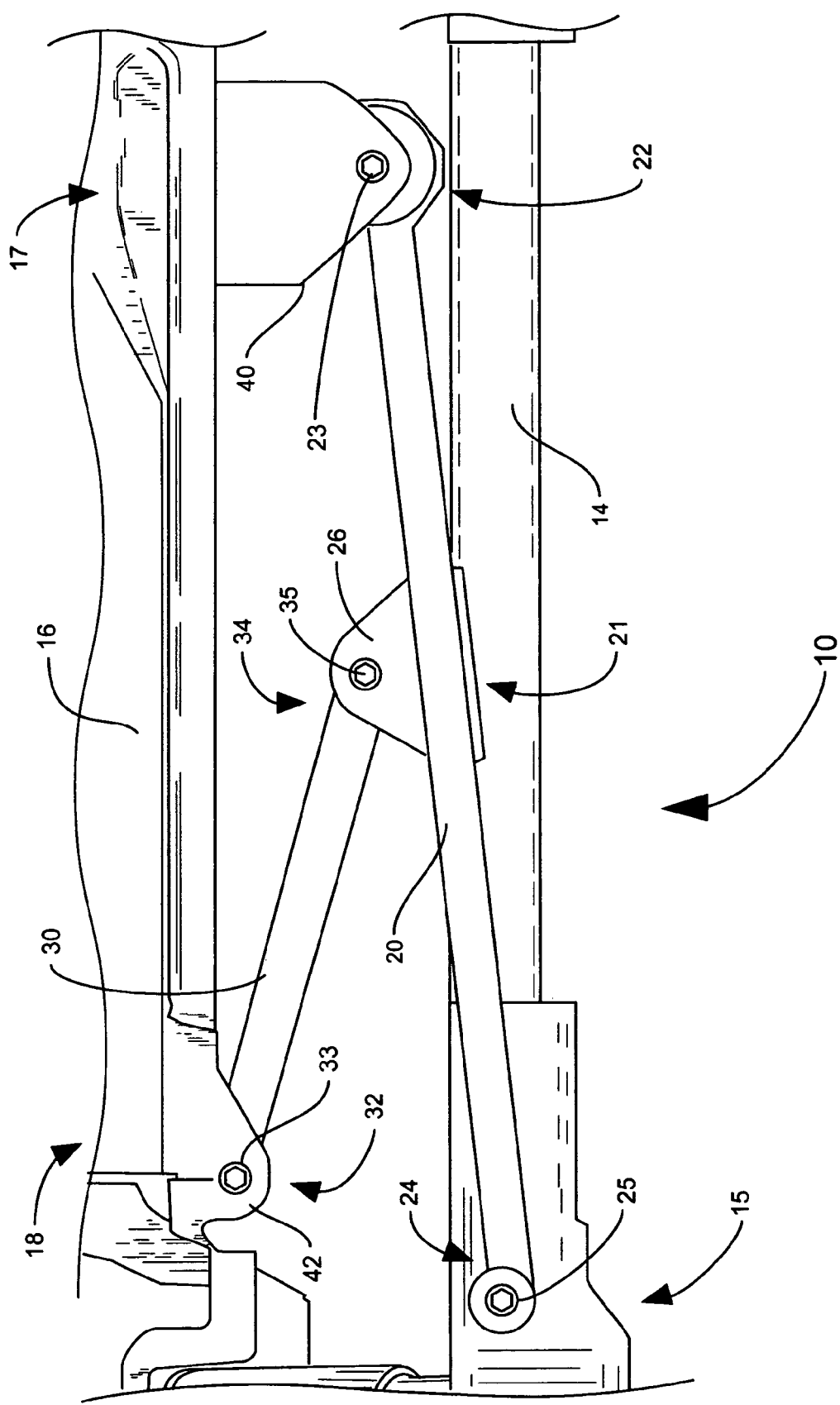
FIG. 2 illustrates an expanded rear view of the axle beam suspension system of FIG. 1.
Figure 3:
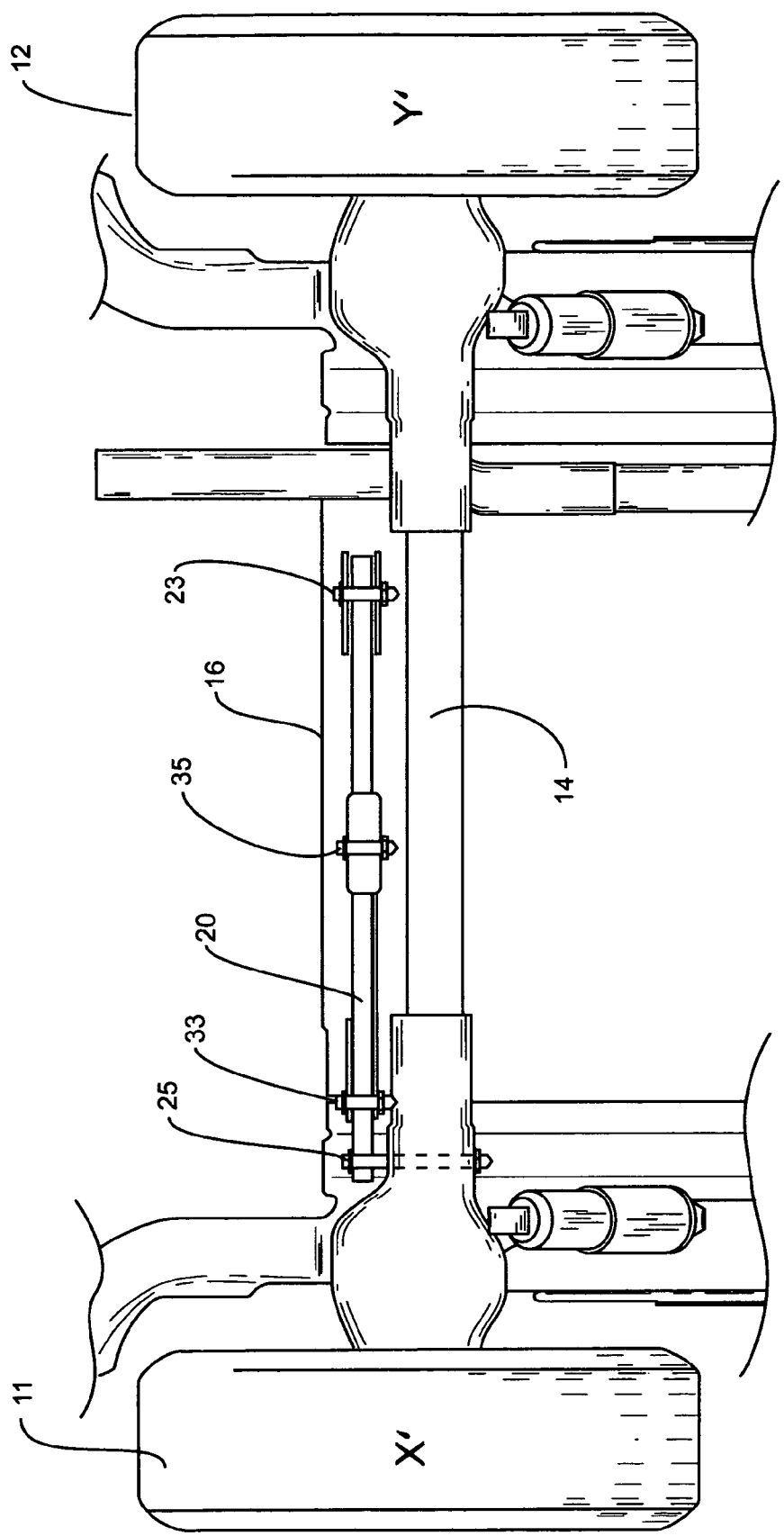
FIG. 3 illustrates a bottom view of the axle beam suspension system of FIG. 1.

The track bar 20 is about half the width of the main vehicle body 16. The width of the complete main vehicle body is generally about the distance between the first wheel 11 and the second wheel 12. The illustrated bottom portion of the main vehicle body 16 is narrower than the complete width of the main vehicle body. As illustrated in FIGS. 1-3, the axle 14 is a rear axle. In one embodiment, the axle is a front axle. In another embodiment, the axle beam suspension system 10 is attached to a front axle and a rear axle.

FIG. 2 illustrates an expanded view of the axle beam suspension system 10 of FIG. 1. The track bar 20 includes a controlling connection portion 21, a first end 22 and a second end 24. The first end 22 of the track bar 20 is attached at lateral attachment 23 to a lateral joint connection portion 17 of the main vehicle body 16. Specifically, the track bar 20 is attached at the first end 22 to a first downward projecting attachment bracket 40 of the lateral joint connection portion 17. This first end connection between the first end 22 and the first downward projecting attachment bracket 40 allows for lateral movement of the first end 22 about the first downward projecting attachment bracket 40.

The second end 24 of the track bar 20 is attached at a pivot attachment 25 to a pivot joint portion 15 of axle 14.

The control bar 30 has a first end 32 and a second end 34. The first end 32 of the control bar 30 is attached at a control attachment 33 to a control joint connection portion 18 of the main vehicle body 16. Specifically, the control bar 30 is attached at the first end 32 to a second downward projecting attachment bracket 42 of the control joint portion 18 of the main vehicle body 16.

The second end 34 of the control bar 30 is attached at a fourth attachment 35 to the controlling connection portion 21 of the track bar 20. Specifically, the control bar 30 is attached at the second end 34 to a flange portion 26 of the track bar 20. The controlling connection portion 21 of the track bar 20 includes the flange portion 26 extending from the track bar 20 in a mid-region between the first end 22 and the second end 24.

Thus, the axle beam suspension system 10 is attached to the main vehicle body 16 at two points: a first point at lateral attachment 23; and a second point at control attachment 33. The load on the main vehicle body 16 is distributed between these two points. The load distribution reduces the noise levels and harshness measurements of the ride. This load distribution also allows for a reduction in the body structure required to support the load on the main vehicle body 16.

FIG. 3 illustrates a bottom view of an axle beam suspension system 10 in a mobile vehicle in accordance with the present invention. The lateral attachment 23 extends through the track bar 20 and the first downward projecting attachment bracket 40, not visible in this bottom view. The pivot attachment 25 extends through the track bar 20 and into the axle 14. The control attachment 33 and the fourth attachment 35 extend through the track bar 20 and the control bar 30, which is not visible in this bottom view. Point X' and point Y' approximately indicate the bottomward projections of the points where axle 14 is attached to first wheel 11 and second wheel 12, respectively.

The track bar 20 lies in a plane seen cross-sectionally as line 48. Line 48 is parallel to the length of axle 14. The lateral attachment 23, the pivot attachment 25, the control attachment 33 and the fourth attachment all intersect line 48. The control bar 30, which is obstructed from view by the track bar 20 in FIG. 3, is in also in the plane.

Figure 4:
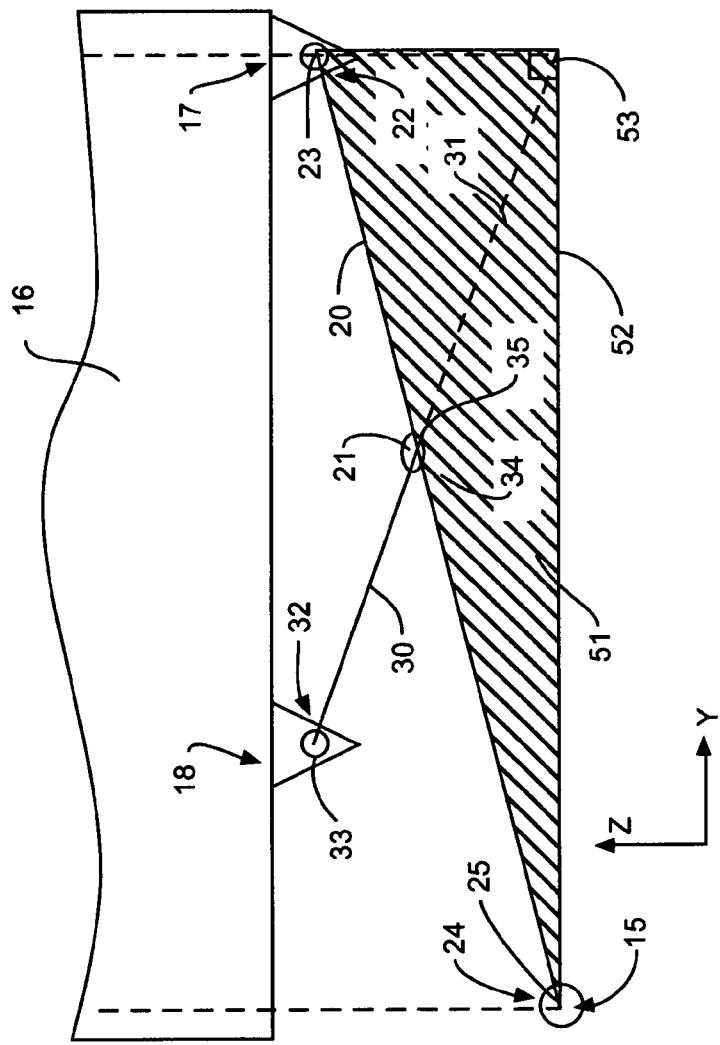
FIG. 4 illustrates a line diagram of a rear view of the axle beam suspension system in accordance with the present invention.

FIG. 4 illustrates a line diagram of a rear view of the axle beam suspension system 10 in accordance with the present invention. The track bar 20 and the control bar 30 lie in a plane defined by the Y-Z axes. The plane was seen cross-sectionally as line 48 in FIG. 3, thus the track bar 20 and the control bar 30 lie in a plane that is parallel to the axle 14.

The track bar 20 forms a hypotenuse of a cross-hatched triangle 51 in the plane. Line 52 forms a baseline of the triangle 51 and is parallel to the length of axle 14. A line 31 extends from the second end 34 of the control bar 30 and intersects the right-angle 53 of the triangle 51. Line 31 is parallel to the line shown in FIG. 4 as the control bar 30. In an axle beam suspension system 10, any track bar 20, control bar 30 and axle 14 configuration satisfying these geometric constraints and the attachment constraints described below with reference to FIG. 5, has the advantages of the present invention.

The relative lengths of the track bar 20, the control bar 30 and the length of axle 14 shown in FIG. 4 are different from those shown in FIGS. 1-3, to illustrate the flexibility of this geometric configuration.

Figure 5:
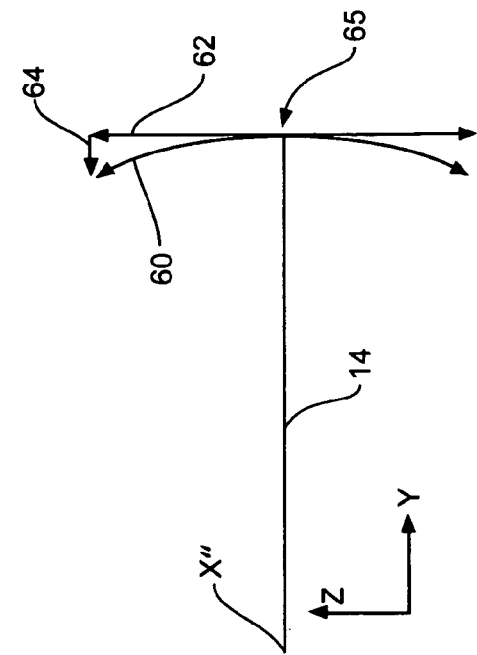
FIG. 5 schematically illustrates the difference in axle kinematics between the prior art and the present invention.

FIG. 5 schematically illustrates the difference in kinematics for an axle-pivoting-movement in the prior art and in the present invention. The jouncing and rebounding of first wheel 11 and/or second wheel 12 either simultaneously or separately can cause the axle-pivoting-movement. The axle 14 is attached to first wheel 11 at about the center of mass of first wheel 11, which is indicated as point X". Any axle-pivoting-movement due to offset of second wheel 12 is centered about this pivotal point X". The point 65 indicates the position of the center of mass of the second wheel 12 when the second wheel 12 is at rest.

When the second wheel 12 is perturbed, the second wheel 12 bounds up and/or down with a resulting axle-pivoting-movement. Upon perturbation, the center of mass of the second wheel 12 moves. If the movement of the second wheel 12 is along the X axis, the trajectory of the center of mass can be traced in the Y-Z plane over time after the perturbation. Two trajectories for the center of mass of second wheel 12 are traced in the Y-Z plane and are shown as curved vector 60 and straight vector 62.

A prior art axle beam suspension system having a shortened track bar traces a center of mass path as the curved vector 60. Curved vector 60 has an arc substantially in the vertical direction with a lateral component shown as vector 64. The lateral component vector 64 causes shake and/or vibration of the main vehicle body 16.

The axle beam suspension system 10 of the present invention has a shortened track bar 20 and traces a center of mass path as the straight vector 62 since the lateral portion of an axle-pivoting-movement, shown as vector 64, is transferred into lateral movement of the axle beam suspension system 10. Specifically, the lateral portion 64 of an axle-pivoting-movement is transferred into an equal and opposite lateral movement of the lateral attachment 23 in the axle beam suspension system 10 so that the center of mass of the second wheel 12 attached to an end of the axle 14 moves in a vertical path. The first end 22 of the track bar 20 moves laterally about the lateral attachment 23 by an amount equal in length and opposite in direction to the vector 64.

The second wheel 12 bounds up and/or down in an axle-pivoting-movement in response to the perturbation, the center of mass of the second wheel 12 travels in the vertical direction without a lateral component 64. Since there is no lateral component 64 experienced by second wheel 12 upon bouncing, the main vehicle body 16 does not shake and the occupants experience a more comfortable ride in the mobile vehicle. Additionally, the space required for the wheel packaging is reduced since the wheel packaging does not need to accommodate any lateral movement of the first wheel 11 or the second wheel 12. Alternatively, the wheel and/or tire size can be increased for a given wheel package.

The shortened track bar 20 of the axle beam suspension system 10 provides stability equivalent to a hypothetical infinite-length track bar.

FIG. 5 can be flipped about a vertical axis to show the projected path on a plane of the center of mass of first wheel 11 when the first wheel 11 bounds up and/or down in an axle-pivoting-movement in response to a perturbation to the first wheel 11. In that case, the point X" becomes the point where the opposing end of the axle 14 is attached to second wheel 12 at about the center of mass of second wheel 12. The first wheel 11 bounds up and/or down in an axle-pivoting-movement in response to the perturbation, the center of mass of the second wheel 11 travels in the vertical direction without a lateral component.

If both first wheel 11 and second wheel 12 bound up and/or down in an axle-pivoting-movement, the center of mass of the first wheel 11 and the second wheel 12 will be offset vertically by the same or differing amounts. The axle beam suspension system 10 will then ensure the center of mass of the second wheel 12 travels in the vertical direction without a lateral component 64 and the center of mass of the first wheel 11 travels in the vertical direction without a lateral component.

Referring to FIGS. 2-4, the first ends 22 and 32 and second ends 24 and 34 of the track bar 20 and the control bar 30, respectively, are operably attached to rotate or to rotate and flex. The first ends 22 and 32 and second ends 24 and 34 of the track bar 20 and the control bar 30, respectively, are operably attached with at least one bushing. The bushing attaching the first end 22 of the track bar 20 has a softer rate than the rate of the other bushings.

The first end 22 of the track bar 20 flexes laterally about the lateral attachment 23 in the lateral joint connection portion 17. In one embodiment, the first end 22 of the track bar 20 flexes laterally and rotates about the lateral attachment 23 in the lateral joint connection portion 17. The second end 24 of track bar 20 rotates and/or flexes about the pivot attachment 25 in the pivot joint portion 15 of the axle 14.

The first end 32 of the control bar 30 rotates and/or flexes about the control attachment 33 of the control joint connection portion 18. The second end 34 of the control bar 30 rotates and/or flexes about the fourth attachment 35 of the controlling portion 21.

The lateral attachment 23, the pivot attachment 25, the control attachment 33 and the fourth attachment 35 each include a bushing to provide the rotational and flexional capability. Bushings are rated according to softness or amount of flexibility. The bushing at the lateral attachment 23 has a softer rate than the bushings at the pivot attachment 25, the control attachment 33, and the fourth attachment 35. This softer rate of the bushing in the lateral attachment 23 allows the first end 22 of the track bar 20 to move laterally about the lateral attachment 23 in the lateral joint connection portion 17 as the second wheel 12 moves up and/or down.

In one embodiment the lateral attachment 23 has a slider bushing and the pivot attachment 25, the control attachment 33 and the fourth attachment 35 do not have slider bushings.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An axle beam suspension system for a mobile vehicle, the system comprising:
   a main vehicle body including a first downward projecting attachment bracket and a second downward projecting attachment bracket;
   an axle attached to the main vehicle body;
   a track bar including a flange portion extending from the track bar in a mid-region, the track bar attached at a first end to the first downward projecting attachment bracket and attached at a second end to a pivot joint attachment bracket on the axle, wherein the first end connection allows for a lateral movement of the first end about the first downward projecting attachment bracket; and
   a control bar attached at a first end to the second downward projecting attachment bracket and attached at a second end to the flange portion of the track bar,
   wherein a lateral portion of an axle-pivoting-movement is transferred into lateral movement of the axle beam suspension system.

2. The system of claim 1, wherein the track bar and the control bar lie in a plane parallel to the axle.

3. The system of claim 2, wherein the track bar forms a hypotenuse of a triangle in the plane and wherein an extension of a line from the second end of the control bar intersects a right angle of the triangle.

4. The system of claim 1, wherein the lateral portion of the axle-pivoting-movement is transferred into lateral movement of the first end o and wherein a wheel attached to an end of the axle moves vertically.

5. The system of claim 1, wherein a length of the track bar is about half of a width of the main vehicle body.

6. The system of claim 1, wherein the first and second ends of the track bar and control bar are operably attached to rotate and flex.

7. The system of claim 1, wherein each of the first and second ends of the track bar and control bar are operably attached with at least one bushing.

8. The system of claim 7, wherein the bushing attaching the first end of the track bar has a softer rate than the rate of the other bushings.

9. The system of claim 1, wherein the axle is a rear axle.

* * * * *